United States Patent [19]

Lampinen et al.

[11] Patent Number: 5,645,952
[45] Date of Patent: Jul. 8, 1997

[54] METHOD AND APPARATUS FOR CHARGING AND DISCHARGING ELECTRIC ENERGY

[75] Inventors: Markku Lampinen, Louhentie 20 E 37, FIN-02130 Espoo; Minna Viitanen, Jokioinen; Jaakko Lamminen, Järvenpää, all of Finland; Marina Fomino, Ames, Iowa

[73] Assignee: Markku Lampinen, Espoo, Finland

[21] Appl. No.: 318,727

[22] PCT Filed: Apr. 13, 1993

[86] PCT No.: PCT/FI93/00154

§ 371 Date: Oct. 13, 1994

§ 102(e) Date: Oct. 13, 1994

[87] PCT Pub. No.: WO93/21664

PCT Pub. Date: Oct. 28, 1993

[30] Foreign Application Priority Data

Apr. 14, 1992 [FI] Finland ................ 921655

[51] Int. Cl.$^6$ ................ H01M 12/08
[52] U.S. Cl. ................ 429/25; 429/27; 429/41; 429/50
[58] Field of Search ................ 429/25, 27, 41, 429/50, 61

[56] References Cited

U.S. PATENT DOCUMENTS

| | | |
|---|---|---|
| 3,087,004 | 4/1963 | Thorsheim ................ 429/25 |
| 3,112,228 | 11/1963 | Young ................ 429/25 |
| 3,520,728 | 7/1970 | Beccu . |
| 4,107,405 | 8/1978 | Percheron born Guegen et al. ...... 429/218 |
| 4,528,251 | 7/1985 | Yamaguchi et al. ................ 429/25 |
| 4,609,599 | 9/1986 | Percheron nee Guegan et al. . 429/218 |
| 4,661,425 | 4/1987 | Juda ................ 429/206 |
| 5,423,967 | 6/1995 | Kunimatsu et al. ................ 429/41 X |

FOREIGN PATENT DOCUMENTS

| | | |
|---|---|---|
| 37 02 138 A1 | 8/1988 | Germany . |
| 1276260 | 6/1972 | United Kingdom . |

*Primary Examiner*—Stephen Kalafut
*Attorney, Agent, or Firm*—Kubovcik & Kubovcik

[57] ABSTRACT

A method and apparatus for storing and producing electrical energy in an electrochemical cell, where the cathode is a porous air electrode and the anode is a hydrogen-containing metal hydride. According to the invention, an overpressure is allowed to form inside the porous air electrode during charging, the said pressure preventing the formation of hydrogen bubbles on the metal hydride electrode. The overpressure remains at the desired level because the pores of the air electrode are made so small that the surface tension of the electrolytic solution penetrating into the pores seals the porous air electrode.

24 Claims, 15 Drawing Sheets

METHOD AND APPARATUS FOR CHARGING AND DISCHARGING ELECTRIC ENERGY

The object of the invention is a method for storing and producing electrical energy in the type of electrochemical cell, where the cathode is a porous air electrode which takes oxygen from the ambient air, or to which oxygen is supplied by other means, and the anode is a hydrogen-containing metal hydride, and according to which method the hydrogen stored in the metal hydride anode and acting as fuel is oxidized through an electrolytic solution with oxygen supplied to the air electrode.

The prior art comprises fuel cells in which hydrogen gas is supplied to a negative electrode, that is, anode, and oxygen which is either pure or contained in air, is supplied to a positive electrode, that is, cathode. In the cell's overall reaction, the only reaction products formed in addition to electrical energy are water and some heat. The advantage of fuel cells is good efficiency and unpolluted reaction products. Their use is, however, limited for example in traffic applications, by the handling and storability of gaseous hydrogen.

The prior art also comprises so-called metal air cells, having a metal such as zinc, iron or aluminium as the anode, and an air electrode as the cathode. In these cells, the metal becomes oxidized and dissolves in the electrolyte. The advantage of the cells is a high energy density, and the disadvantages are e.g. self-discharging, that is, corrosion of the metal when at rest, and the gradual passivation of the surface of the metal. Prior art is represented by e.g. the following patents and patent applications: Sweden no. 358772 (H01M 4/86), WO 88/02931 (H01M 8/18), Norway no. 883432 (H01M 8/12), Norway no. 156469 (H01M 8/12) and European patent no. 0124275 (H01M 8/18).

The prior art is further represented by porous, gas-permeable air electrodes, or oxygen electrodes. The disadvantage of these solutions is, however, that the pressure of the electrolytic solution with respect to the ambient air cannot be significantly increased due to leaks. It is known to situate the catalyst layer on the surface against the electrolyte. The known materials used in air electrodes include highly electroconductive carbon, for example, so-called carbon black, Teflon as binder, and platinum, silver or different compounds such as cobolt tetraporphyrine as the catalyst. The prior art appears, for example, from the patents and patent applications DE-3332625 A1 (H01M 4/86), DE-3400022 A1 (H01M 4/86), DE-3632701 A1 (H01M 4/86), DE-3722019 A1 (H01M 4/86), DT-2547491 A1 (H01M 4/86), DT-2556731 A1 (H01M 4/86), DE-3331699 A1 (H01M 4/86), U.S. Pat. No. 4,877,694 (H01M 4/86), Norway no. 802635 (H01M 4/86), U.S. Pat. No. 4,927,718 (H01M 4/86), and Sweden no. 324819 (H01M 4/86). These electrodes are sometimes called hybride electrodes—especially in connection with metal air cells—which is not the same as hydride electrodes, which are explained in greater detail below. The prior art of the air electrodes called hybride electrodes appears e.g. from the publications DE-2658520 A1 (H01M 4/86), DT-2611291 A1 (H01M 4/86), and DT-2455431 A1 (H01M 4/86).

It is also known to store hydrogen in different metals, metal alloys, and other compounds, which are collectively called hydrides. Hundreds of compounds which are able to absorb large amounts of hydrogen into themselves are known. With the different compounds, hydrogen absorption amounts of different magnitudes are achieved, and their equilibrium pressures —that is, the partial pressure of hydrogen in gas—depend on the composition of the hydride and on the temperature. Depending on the compound, the hydrogen absorption amounts of hydrides are typically of the order of 1–10% by weight, and the equilibrium pressures at room temperature are of the order of 0.1–10 bar. For example the $LaNi_5H_6$ hydride and its different modifications such as $LaNi_{2.5}Co_{2.4}Al_{0.1}$ and $MmNi_{3.5}Co_{0.7}Al_{0.8}$ have been much studied. The capacity of the hydrides and the prior art appear, for example, from the patents and patent applications DT-2003749 (C01B 6/00), U.S. Pat. No. 4,721,697 (C01B 6/00), U.S. Pat. No. 4,629,720 (C01B 6/00), U.S. Pat. No. 4,656,023 (C01B 6/00), U.S. Pat. No. 4,661,415 (C01B 6/00), U.S. Pat. No. 4,567,032 (C01B 6/00), U.S. Pat. No. 4,556,551 (C01 B6/00), and Sweden no. 456248 (C01B 6/00). The use of hydrogen-storing materials, that is, hydrides as electrodes in batteries is prior art. For example, Philips have studied and developed a so-called nickel-hydride battery in which hydrogen is stored in a negative hydride electrode, that is, anode ($MH_x$), with a nickel electrode as the cathode. The overall reaction of the discharge is

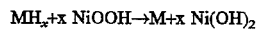

$$MH_x + x\, NiOOH \rightarrow M + x\, Ni(OH)_2$$

in other words, the hydrogen transfers from the anode to the cathode. In charging, the reaction equation is inverse. These studies have been published e.g. in the doctoral thesis: J. J. G. Willems: "Metal hydride electrodes stability of $LaNi_5$-related compounds", Philips J. of Research, Vol. 39, Suppl. No. 1 (1984), and the composition of the metal hydride has a patent: U.S. Pat. No. 4,487,817 (Dec. 11, 1984). Later prior art of hydride electrodes is represented by patent application no. WO 91/08167 (C01B 6/00). Using hydride electrodes to produce hydrogen directly by means of sunlight has also been studied and is known e.g. from the publication DE-3704171 A1 (C01B 6/00).

Also of the prior art are fuel cells, the fuel of which, hydrogen gas, is stored in a separate metal hydride container from which hydrogen gas can be released when required and supplied further to the fuel cell. The hydrogen gas is released from the metal hydride by heating the container. In the United States a fuel cell of this type and a metal hydride container have been constructed to provide the energy source for an electric car (Motor Review 1992). As advantages are seen particularly the unpolluting nature of the fuel cell because only water vapour is produced as a reaction product, and the safety of storing hydrogen in metal hydride, which means that there is no danger of explosion. However, a small danger of explosion is created by the hydrogen gas released from the container and supplied to the fuel cell.

It is also known to store hydrogen in a metal hydride electrode acting as the anode of an electrochemical cell, and that the hydrogen used as fuel is oxidized electrochemically, directly in the metal hydride. An electrochemical cell is thus used to store and produce electrical energy, the cell having as the cathode an oxygen or air electrode, to which pure oxygen or oxygen contained in air is supplied to oxidize the hydrogen used as the fuel. This prior art is described, for example, in the patents U.S. Pat. No. 3,520,728, U.S. Pat. No. 4,609,599, U.S. Pat. No. 4,661,425 and GB-1,276,260. None of these discuss the problem of self-discharging of hydrogen.

The advantages compared with the above-mentioned fuel cell, into which hydrogen is introduced in gaseous form from a metal hydride container, are the following: the energy density is better, because a separate hydrogen electrode is not required; the apparatus is safer, because hydrogen does not appear in gaseous form at any stage; the system for controlling hydrogen consumption is simpler because the electric current applied determines the consumption of hydrogen directly, through the oxidization reaction of hydrogen; the apparatus is more efficient because one stage of the process—releasing the hydrogen from the metal hydride by heating—is eliminated.

The advantageousness is based on the fact that the storage material acts at the same time as an electrode and the oxygen needed for oxidizing the hydrogen is taken directly from the ambient air. Taking oxygen from the air makes possible a high energy density as it does not have to be stored in the cell and carried with the cell. In laboratory tests the energy density has been measured at about 240 Wh/kg, when the weight of the metal hydride $LaNi_5$ is taken into account. In practice this corresponds to an energy density of about 120 Wh/kg, when the total weight of the cell is taken into account.

The problem with the above-described electrochemical cell is, however, its self-discharging, that is, the gradual release of hydrogen from the hydride, especially during charging. From the point of view of functioning it is important to eliminate the formation of hydrogen bubbles on the surface of the metal hydride, as hydrogen tends to escape as bubbles.

One such known cell solution which discusses the self-discharging problem is described in the U.S. Pat. No. 3,511,710. In it, the cathode is an air or oxygen electrode, and hydrogen—which is the fuel—is bonded to the hydride, and the solution also aims at reducing the release of hydrogen in gaseous form, that is, self-discharging, by using a so-called auxiliary voltage in the hydrogen electrode, which is preferably at least 40 mV, with respect to the NHE electrode.

U.S. Pat. No. 4,107,405 presents a solution in which the aim is to reduce the release of hydrogen as a gas, that is self-discharging, by coating the metal hydride with a thin metal film, or with ions adsorbing to the surface of the metal hydride and thus preventing the desorption of hydrogen.

The aim of the present invention is to achieve a simpler and more efficient method for eliminating the self-discharging of hydrogen in a metal hydride/air electrode cell. It is characteristic of the method according to the invention that to store and produce electrical energy, the pressure of the electrolytic solution situated inside the porous air electrode and in contact with the metal hydride electrode, is increased so that it is higher than the pressure of the ambient air outside the porous air electrode.

When the pressure of the cell's electrolyte is gradually increased, it can be seen that hydrogen bubbles are first formed on the hydride electrode. However, this stops when the pressure of the electrolyte rises higher than the discharging pressure of the hydrogen bonded in the metal hydride. After this, the release of hydrogen takes place only as molecular diffusion, which is extremely slow compared to discharging in the form of bubbles. According to the invention, the self-discharging of the cell is thus prevented.

In the solution according to the invention, a gas space is used which allows for surface changes of the electrolytic solution as the amount of water changes. During charging, oxygen gas formed accumulates to the gas space, the pressure of which settles at a level of at least the ambient air pressure, in order that it could flow out of the cell during charging. When the cell is in the state of equilibrium, there is hydrogen and oxygen in the gas space, the partial pressure of the hydrogen being equivalent to the equilibrium pressure of the metal hydride.

For example, with a $LaNi_5$ metal hydride electrode the equilibrium pressure of hydrogen is 4 bar at a temperature of 40° C., and correspondingly 2 bar at a temperature of 20° C. Since there is oxygen gas in the cell, the absolute pressure of which is at least 1 bar, the safety valve operating during charging must be designed to open only at pressures exceeding 5 bar, that is, at an overpressure of 4 bar, if the apparatus is designed to function up to the temperature of 40° C. Correspondingly, if the apparatus is designed to function up to the temperature of 20° C., the safety valve must be designed to open at pressures exceeding 3 bar, that is, at an overpressure of 2 bar, to prevent the release of hydrogen in the form of a gas. Even if the equilibrium pressure of hydrogen with the metal hydride electrode was below 1 bar, for example with an $LaNi_3Co_2$ electrode, overpressure will still be formed in the cell due to the oxygen gas which is already there.

The pressure of formation of a hydrogen bubble is not only dependent on the equilibrium pressure, but also on the magnitude of the charging current. The higher the charging current used, the higher the pressure of formation of the hydrogen, which is always at least as high as the equilibrium pressure. Therefore, in practice, to prevent the formation of hydrogen bubbles, significantly higher pressures must be used than required by the equilibrium pressure. In practice the opening pressure of the cell's safety valve must be sought experimentally to be such that hydrogen bubbles are not formed during charging either.

Increasing the pressure of the electrolyte in the cell with respect to outside air is possible by means of surface tension and a sufficiently small pore size without the occurrence of leaks through the air electrode. If the radius of the pore is $r=10^{-7}$ m, the surface pressure $\pi=60.10^{-3}$ N/m, and the contact angle $\phi=0°$, the pressure difference between the solution and the ambient air, without that the liquid leakes out of the pores into the ambient air, can be as big as (Laplace equation):

$$\delta p = 2.\pi.\cos\phi/r = 2.60.10^{-3}.1/10^{-7}\ Pa = 12\ bar.$$

Even at high overpressures, the impermeability to liquid of the air electrode provided with very small pores, according to the invention, is based on this surface tension phenomenon.

To improve the capacity of the cell, it is known, for example from the U.S. Pat. No. 4,609,599 to increase the pressure of the ambient air or oxygen gas. According to the invention the cell is, however, pressurized inside to an overpressure with respect to the ambient air, the purpose of this being to prevent self-discharging. The oxygen required in the positive electrode is then obtained directly from the ambient air which is under normal pressure according to the invention. In the invention, the oxygen formed in charging also flows out as a gas from the cell system. p The functioning of the method of storing electrical energy is based on experiments carried out and on theoretical findings according to which there is very little discharge of hydrogen as molecular diffusion without bubbles from the metal hydride to the electrolyte and through the air electrode. Similarly, there is little direct oxidization of hydrogen due to the high diffusion resistance of the oxygen in the electrolyte.

Theoretically this can be shown by calculating the rate of discharge of hydrogen in a case where diffusion resistance is the only resisting factor. The temperature is 25° C., the thickness of the electrolyte layer is 2 mm, the partial pressure of the hydrogen is 2.5 bar and the surface area of the air electrode is 30 cm². Let us assume that the electrolyte is saturated with respect to the dissolved hydrogen on the surface of the metal hydride electrode, and at a distance of 2 mm the hydrogen concentration is zero, because hydrogen is released through the air electrode. In these conditions the hydrogen concentration can be at most 2.1 mol/m$^3$ (solubility=7.72.10$^{-6}$ mol/(m$^3$Pa)) and the diffusion coefficient 1.3.10$^{-9}$ m$^2$/s (source: Journal of Physical Chemistry, Vol. 74, No. 8, 1970, p. 1749). In this case the flow of hydrogen from the cell is $$J = -1.3 \bullet 10^{-9} \, m^2/s \bullet \frac{(0-2.1)mol/m^3}{0.002 \, m} \bullet 30 \bullet 10 \bullet^{-4} m^2 =$$

$$4.1 \bullet 10^{-9} \, mol/s.$$

This further gives the corresponding amount of ampere-hours per day, that is, the loss:

4.1.10$^{-9}$ mol/s . 2.96500 As/mol . 24 h/day=19 mAh/day.

In the cell discussed above there is about 20 g of metal hydride, and in it 1.4% by weight of hydrogen, and if no hydrogen escapes from the cell, the cell gives 7.44 Ah. According to the above calculation, the discharge is thus 0.255% /day, and thus in 1.1 years, the cell would discharge completely by the diffusion mechanism.

In the following is presented a similar calculation for the direct oxidization of hydrogen, that is, the diffusion of oxygen from the air electrode to the metal hydride electrode is assessed in the same conditions as above. The partial pressure of the oxygen is 0.21 bar. The solution is saturated at the air electrode and the oxygen concentration on the surface of the metal hydride electrode is zero, because oxygen is assumed to react immediately with hydrogen. In the said conditions the maximum concentration of oxygen is 0.29 mol/m$^3$ (solubility=12.47.10$^{-6}$ mol/(m$^3$ Pa)) and the diffusion coefficient of the oxygen is 0.4.10$^{-9}$ m$^2$/s (source: Journal of Physical Chemistry, Vol. 74, No. 8, 1970, p. 1749). In this case the flow of oxygen through the electrolyte to the metal hydride electrode is $$J = -0.4 \bullet 10^{-9} \, m^2/s \bullet \frac{(0-0.29)mol/m^3}{0.002 \, m} \bullet 30 \bullet 10 \bullet^{-4} m^2 =$$

$$0.174 \bullet 10^{-9} \, mol/s.$$

The amount of electricity lost through direct oxidization per day is then 0.174.10$^{-9}$ mol/s . 4.96500 As/mol . 24 h/day=1.61 mAh/24 h.

With this mechanism, the discharging of a cell containing 20 g of metal hydride would take 12.7 years.

These two mechanisms, the diffusion of hydrogen and direct oxidization, take place simultaneously, and thus as a sum of the above, the discharge is 20.6 mAh/day, which means that the total discharging of the example cell would take approximately one year. The applicant has studied self-discharging in laboratory tests, the results of which support the above calculations.

The pressure inside the cell is created in two different ways. When there is an auxiliary electrode in the cell, the oxygen gas forming in it during charging creates pressure inside the cell, the magnitude of which is regulated by means of the opening pressure of the overpressure valve. During the discharging of the cell, additional water is formed in the process thus increasing the amount of electrolytic solution and reducing the cell's gas space, and therefore increasing the pressure of the gas. If the air electrode operates in two directions, that is, it is used for both charging and discharging, then the cell must be pressurized by increasing pressure from the outside.

Because the system according to the invention is a closed one, particular attention must be paid to its cooling. Cooling can be realized advantageously by circulating the electrolytic solution. Circulation can take place, for example, so that the electrolytic liquid is led to the vicinity of the auxiliary electrode, or through the metal hydride. The resistance loss of ions in the solution can also be reduced through circulation.

The driving force of the circulation can be achieved in different ways. When using an auxiliary electrode the oxygen bubbles formed during charging create a circulatory motion. By cooling the solution outside the cell, natural circulation based on the differences of density in the liquid is achieved. The reaction

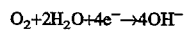

taking place in the air electrode during discharging acts as a kind of "oxygen pump" which creates circulation. Circulation may take place through the hydride electrode, reducing the voltage losses occurring in it and at the same time cooling it. Cooling may also take place in connection with an air electrode by providing air flow around the electrode.

Since the air electrode is porous, carbon dioxide from the ambient air can diffuse through it. If this disadvantageous phenomenon is not prevented, it will cause carbonate formation in the electrolytic solution and the pores of the air electrode, thus blocking it. To prevent this, the system is provided with a carbon dioxide filter through which the air required by the cell is taken. To lengthen the interval for changing the filter, the filter is kept exposed to outside air only when the electric charge of the battery is discharged.

According to the invention, the pressure of the electrolytic solution is increased so that it is higher than the pressure of the ambient air outside the porous air electrode by allowing the pressure of the electrolytic solution to rise as high as desired during charging. The pressure in the electrolytic solution is made such as to prevent the formation of hydrogen bubbles on the surface of the metal hydride electrode.

Maintaining the overpressure and keeping the electrolytic solution inside the air electrode are effected by allowing the electrolytic solution to penetrate into the pores of the air electrode, thus preventing the escaping of the electrolytic solution out through the air electrode, through the surface tension of the electrolytic solution forming on the pores of the air electrode.

The metal hydride used in the electrochemical cell is rehydrogenated in the same cell electrochemically either by means of an air electrode or by using a separate auxiliary electrode. The oxygen gas forming on the separate auxiliary electrode during charging is allowed to discharge from the cell system into the ambient air once the overpressure of the electrolytic solution has become as high as desired.

In the cell, the electrolytic liquid can be led through the metal hydride and/or to the vicinity of the auxiliary electrode used in charging. In this case the circulatory motion of the electrolytic liquid in the cell is achieved during charging by leading the oxygen bubbles forming on the auxiliary electrode to the upper part of the cell, thus creating a circulatory motion when rising up, and/or by cooling the liquid outside the cell, thus achieving natural circulation based on the differences of density in the solution.

The circulatory motion of the electrolytic liquid in the cell is created during discharging by allowing the OH$^-$ ions forming on that surface of the air electrode against the electrolyte to eject the electrolyte supplied to the lower part of the cell through the hydride electrode and/or by cooling the solution outside the cell, thus achieving natural circulation based on the differences of density in the solution.

The cell or battery is cooled by blowing air around the air electrode. The air coming to the air electrode during discharging is led through the carbon dioxide filter which is kept exposed to outside air only when the electric charge of the battery is discharged.

The object of the invention also comprises a new type of apparatus for storing and producing electrical energy in an electrochemical cell with none of the disadvantages of known cells. The cathode in the apparatus is a porous air electrode which takes oxygen from the ambient air, or to which oxygen is supplied by other means, and the anode is a hydrogen-containing metal hydride, and in which apparatus the hydrogen stored in the metal hydride anode and acting as fuel is oxidized through an electrolytic solution with oxygen supplied to the air electrode.

It is characteristic of the invention that the porous air electrode is made to form a container which can be closed and withstands overpressure. The formation of hydrogen bubbles, which are disadvantageous for the functioning of the cell, can be eliminated by pressurizing the cell to a pressure higher than the pressure of formation of the hydrogen bubbles. The functioning of the apparatus according to the invention, when using overpressure, is based on the surface tension phenomenon.

The porous air electrode is made to withstand overpressure by making its pores so small that the surface tension of the electrolytic solution penetrating into the pores keeps the overpressure and electrolytic solution inside the air electrode. The radius of the air electrode pores is for the most part smaller than 0.0001 mm. The air electrode acting as the cathode is cylindrical.

In connection with the closed air electrode an overpressure valve is formed, which—when the metal hydride electrode is hydrogenated electrochemically after use—allows the oxygen gas forming during charging to flow out of the fuel cell system, while the overpressure still remains on the desired level. A separate auxiliary electrode may be located inside the air electrode so that after use, the metal hydride electrode may be electrochemically hydrogenated in the same cell by means of the auxiliary electrode.

To create circulation in the electrolytic liquid, a duct is formed in the cell through which the electrolytic liquid can be led through the metal hydride and/or to the vicinity of the auxiliary electrode used in charging. Alternatively, a duct may be incorporated outside the cell, through which duct the electrolytic liquid can be led through the metal hydride and/or to the vicinity of the auxiliary electrode used in charging.

To ensure cooling, a cooler for the electrolytic liquid, such as a heat exchanger is incorporated outside the cell, in connection with the duct. A fan may also be located in connection with the cell or battery. To prevent harmful carbon dioxide from entering the cell, a carbon dioxide filter is located in connection with the battery, through which filter the air coming to the air electrode is supplied. To lengthen the service life of the carbon dioxide filter, a protective flap is formed in connection with it to open the connection to the outside air only when the electric charge of the battery is discharged.

The method and apparatus according to the invention are not tied to any particular system or application. The invention is described in detail, with examples, in the following, with reference to the appended drawings.

FIG. 1 shows a cross section of one embodiment of the cell according to the invention with an auxiliary electrode for charging.

FIG. 2 corresponds to FIG. 1 and shows a second embodiment of the invention without an auxiliary electrode.

FIG. 3 corresponds to FIG. 1 and shows a third embodiment of the invention, provided with an internal electrolyte circulation.

FIG. 4 corresponds to FIG. 3 and shows a fourth embodiment of the invention, provided with different type of internal electrolyte circulation.

FIG. 5 corresponds to FIG. 3 and shows a fifth embodiment of the invention, provided with an external electrolyte circulation.

FIG. 6 corresponds to FIG. 5 and shows a sixth embodiment of the invention, provided with different type of external electrolyte circulation.

FIG. 7 shows a system comprising several electricity-generating cells and a separate liquid container.

FIG. 8 corresponds to FIG. 7 and shows a second embodiment of the system.

Figure 1:
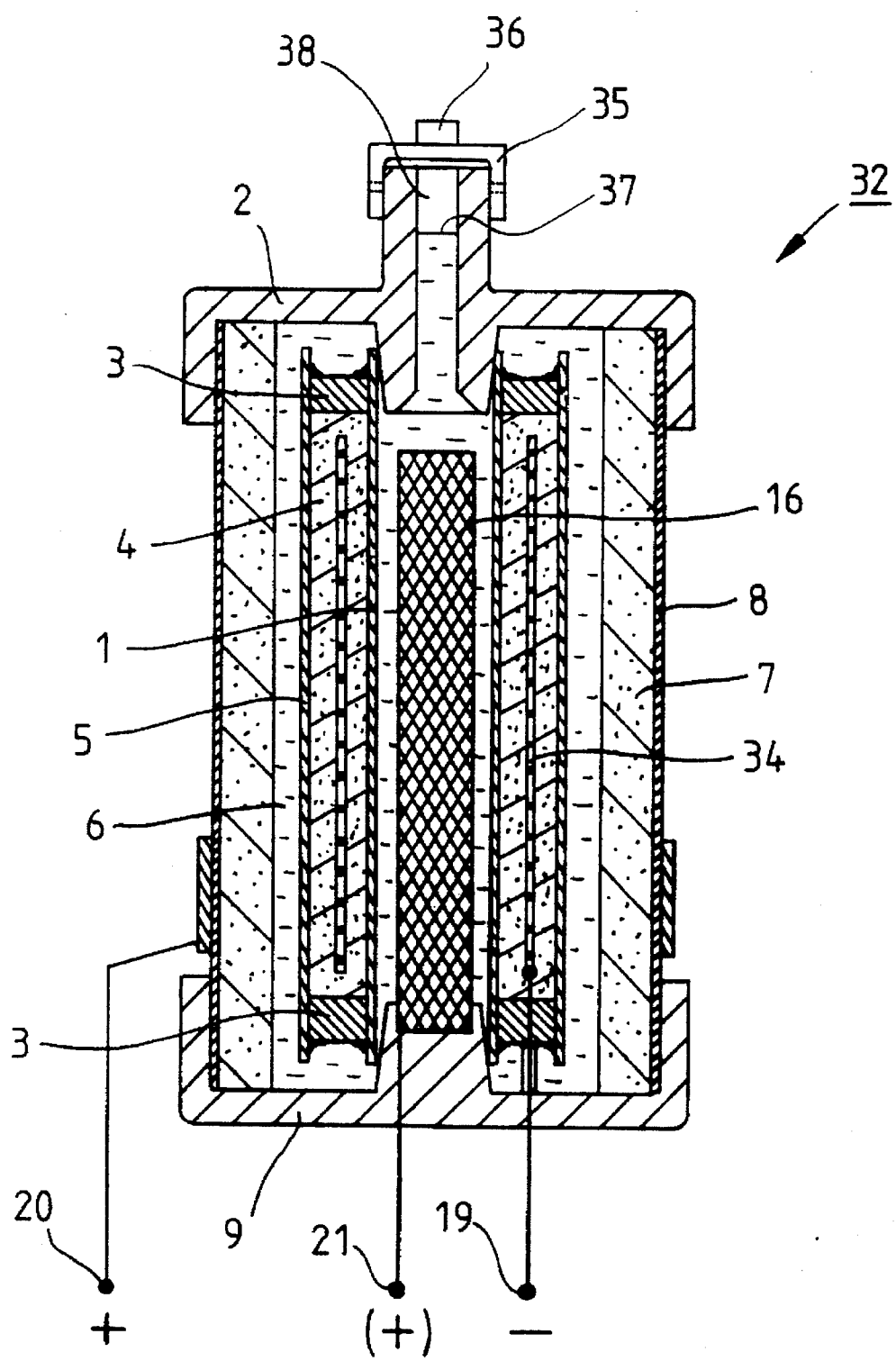

FIG. 1 shows the cell 32 intended for producing electricity, the main parts of which are an air electrode 7, a hydrogen-containing metal hydride electrode 4 which is a metal hydride powder cartridge kept intact with binder, an auxiliary electrode 16, and an electrolyte 6. In the example solution relating to FIG. 1, the cell 32 is cylindrical. Outermost on it is a porous, electroconductive, cylindrical mesh body 8 which acts as the current collector of the air electrode 7. The air electrode 7, which consists of a hydrophobic layer and a catalyst layer, is made on the inner surface of the cylindrical mesh body 8. The catalyst layer of the air electrode 7 is against the electrolyte 6. The electrolyte may be, for example, a concentrated KOH aqueous solution.

The hydrogen-containing metal hydride electrode 4 consists of metal hydride powder which is located between spacer membranes 1 and 5. Above and below the metal hydride powder there are plugs 3. A tubular current-collecting net 34 made of metal acts as the current collector of the anode, or metal hydride electrode 4. The cell 32 is closed with a cover 2 incorporating a safety valve 35 and a supply valve 36. The lower part of the cell 32 is closed with a base 9. The cell 32 of FIG. 1, like the other cells presented below relating to other Figures, can be discharged by setting a load of particular magnitude between the (−)pole 19 and the (+)pole 20, the load being resistance in the exemplified case. A load of 1 ohm is used in the discharge test described below. When the cell 32 discharges, the current passes from the air electrode 7, which is in contact with the (+)pole 20 of the cell, through the external circuit to the metal hydride electrode 4 which is in contact with the (−)pole 19 of the cell. The overall reaction of the cell is $O_2+4H(met.hydr.) \rightarrow 2H_2O$, in other words the hydrogen bonded to the metal hydride and the oxygen gas react to form water in the electrolytic solution, thus raising the surface 37 of the electrolytic liquid during the discharging of the cell.

The overall reaction is the sum of the reactions taking place in the different electrodes. Oxygen reacts in the air electrode 7 according to the reaction $O_2+2 H_2O+4e^- \rightarrow 4OH^-$. The oxygen gas comes to the reaction area, that is, to the interface of the air electrode material and the electrolyte 6, from the air surrounding the cell by diffusing through the porous, cylindrical mesh body 8 and the air electrode 7. In the oxygen reaction, electrons are used up which arrive at the reaction area from an external circuit, and $OH^-$ ions are formed which pass through the electrolyte to the metal hydride electrode 4 and react with the hydrogen released from the metal in accordance with the reaction $OH^-+H \rightarrow H_2O+e^-$.

The electrons released in the reaction on the surface of the metal hydride electrode 4, that is, the metal hydride powder, are conveyed away from the electroconductive metal powder by means of the current-collecting net 34, and through there to the external circuit, and further towards the air electrode 7, to take part again in the reaction of oxygen. In the air electrode 7, the passage of electrons to the reaction area is made possible by the properties of the air electrode material; in addition to being hydrophobic, it is also relatively electroconductive.

The oxygen gas formed in the process of charging flows through the overpressure valve 35 into the ambient air. The opening pressure of the overpressure valve 35 has been set to be such that the desired overpressure is formed inside the cell to prevent the formation of hydrogen bubbles. The surface 37 of the electrolytic liquid falls during charging of the cell because in charging, water is dispersed electrolytically and the oxygen gas formed flows out from the cell. Correspondingly, during discharging of the cell, the surface 37 of the electrolytic liquid rises as oxygen enters the cell, reacting with hydrogen to form water. However, due to voltage loss, some water is consumed during the discharging and charging cycles, and the cell 32, therefore, incorporates a supply valve 36 through which water can be added to the cell 32 if required.

Figure 2:
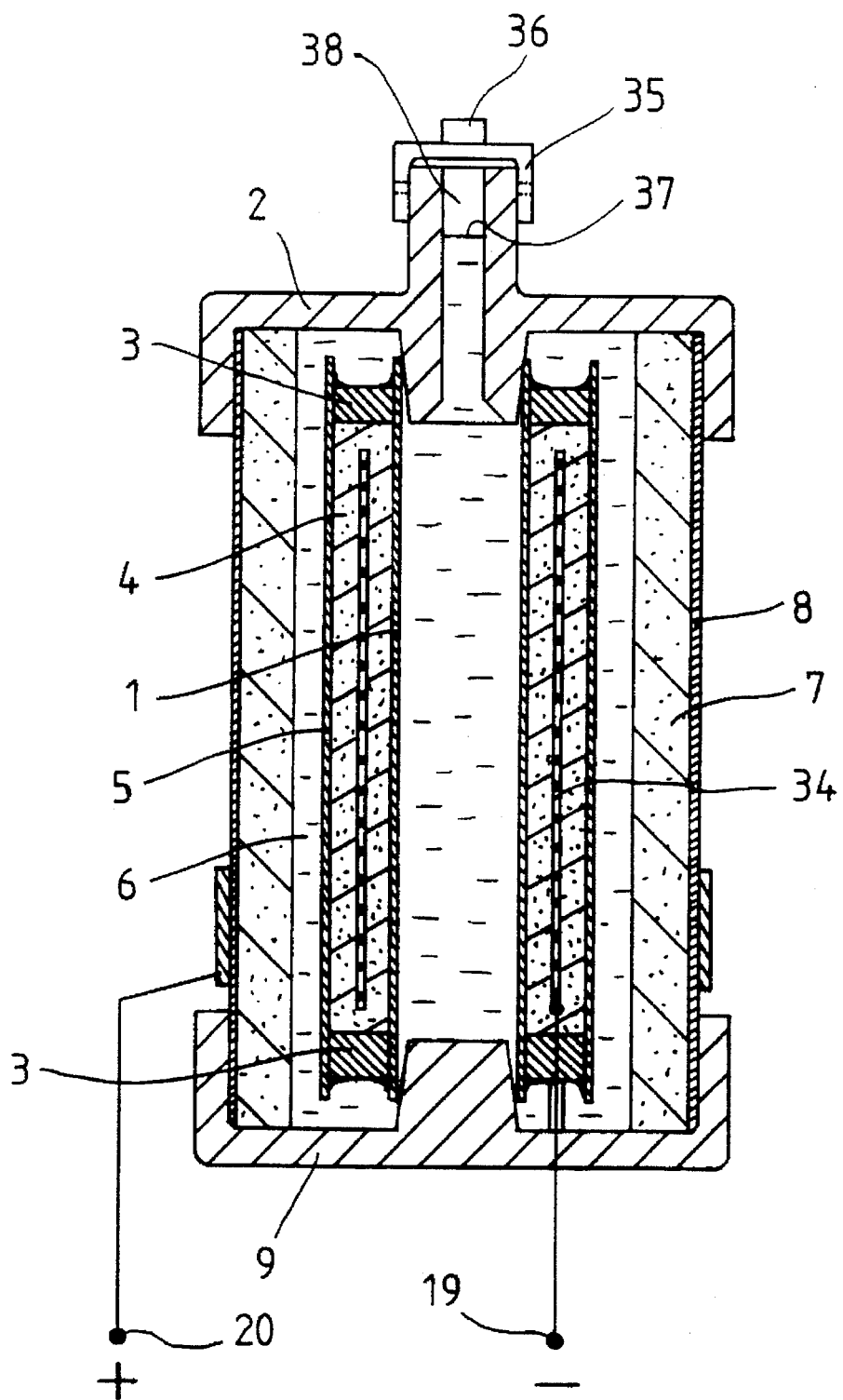

FIG. 2 shows a second embodiment of the cell 32 without an auxiliary electrode. Provided with a suitable catalyst, the air electrode 7 can also be used in charging. During charging by means of an external voltage source, the reaction in the air electrode 7 takes place, with respect to discharging, in the inverse direction $4OH^- \rightarrow O_2+2H_2O+4e^-$ and correspondingly in the metal hydride electrode 4; $4H_2O+4e^- \rightarrow 4OH^- + 4H(met.hydr.)$. The overall reaction in charging is $2H_2O \rightarrow 4H(met.hydr.)+O_2$. The oxygen gas produced discharges into the ambient air through the porous air electrode 7. The overpressure required to prevent the formation of hydrogen bubbles is obtained by increasing the pressure of the gas space 38 of the cell 32 through the valve 36 before taking the cell 32 into use, and where required.

Figure 3:
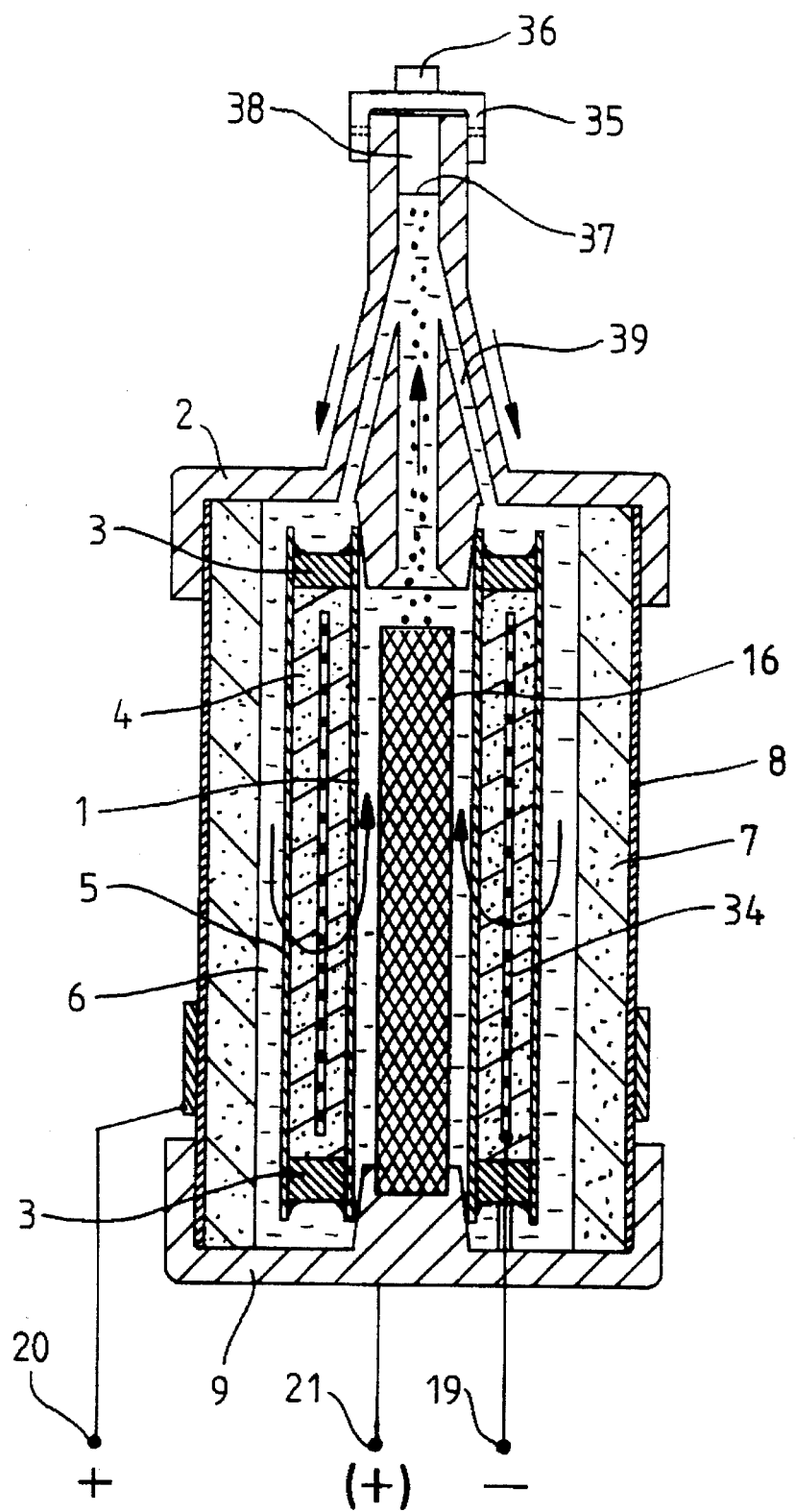

FIG. 3 shows a cell 32 in which charging is realized by means of an auxiliary electrode. The apparatus differs from the apparatus of FIG. 1 in that circulation of the electrolyte has been incorporated in it by means of a return duct 39 formed in the cover 2. The oxygen bubbles formed during charging raise the surface 37 of the electrolytic liquid, after which the oxygen discharges outside the cell through the overpressure valve 35. The movement of the bubbles creates circulation of the electrolytic liquid. The liquid returns to the cell 32 through the return duct 39 and further to the auxiliary electrode 16 through the metal hydride 4. The circulation of the electrolyte makes the operation of the auxiliary electrode more efficient by preventing the formation of an insulating oxygen gas layer on its surface. The circulation of the electrolyte is advantageous also during discharging because it reduces voltage losses in the pores of the hydride electrode.

Figure 4:
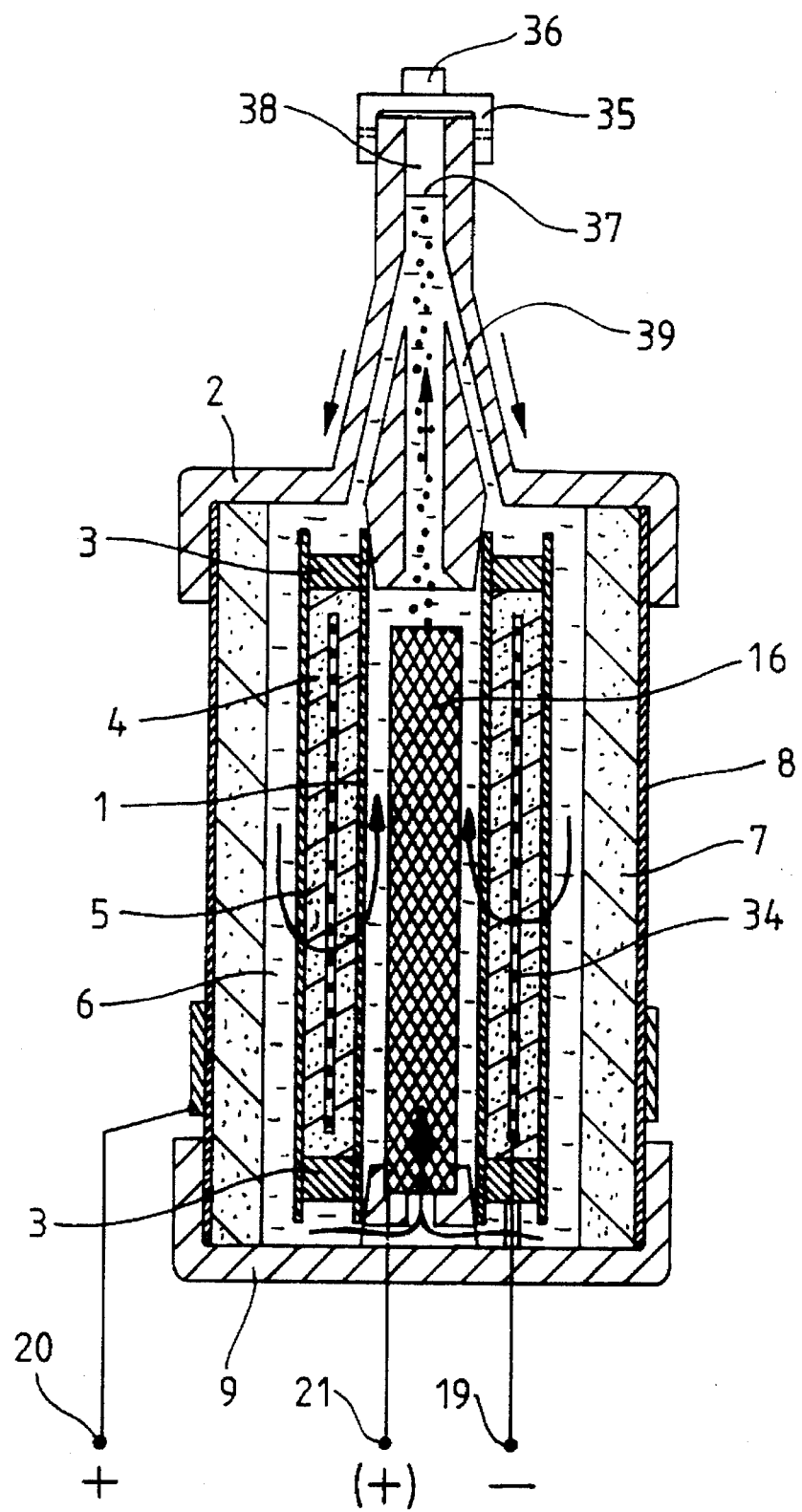

FIG. 4 shows the cell of FIG. 3 but realized with a different type of internal circulation of the electrolyte. The solution differs from FIG. 3 in that some of the electrolytic liquid coming through the return duct 39 is supplied to the auxiliary electrode 16 through a duct formed in the base 9.

Figure 5:
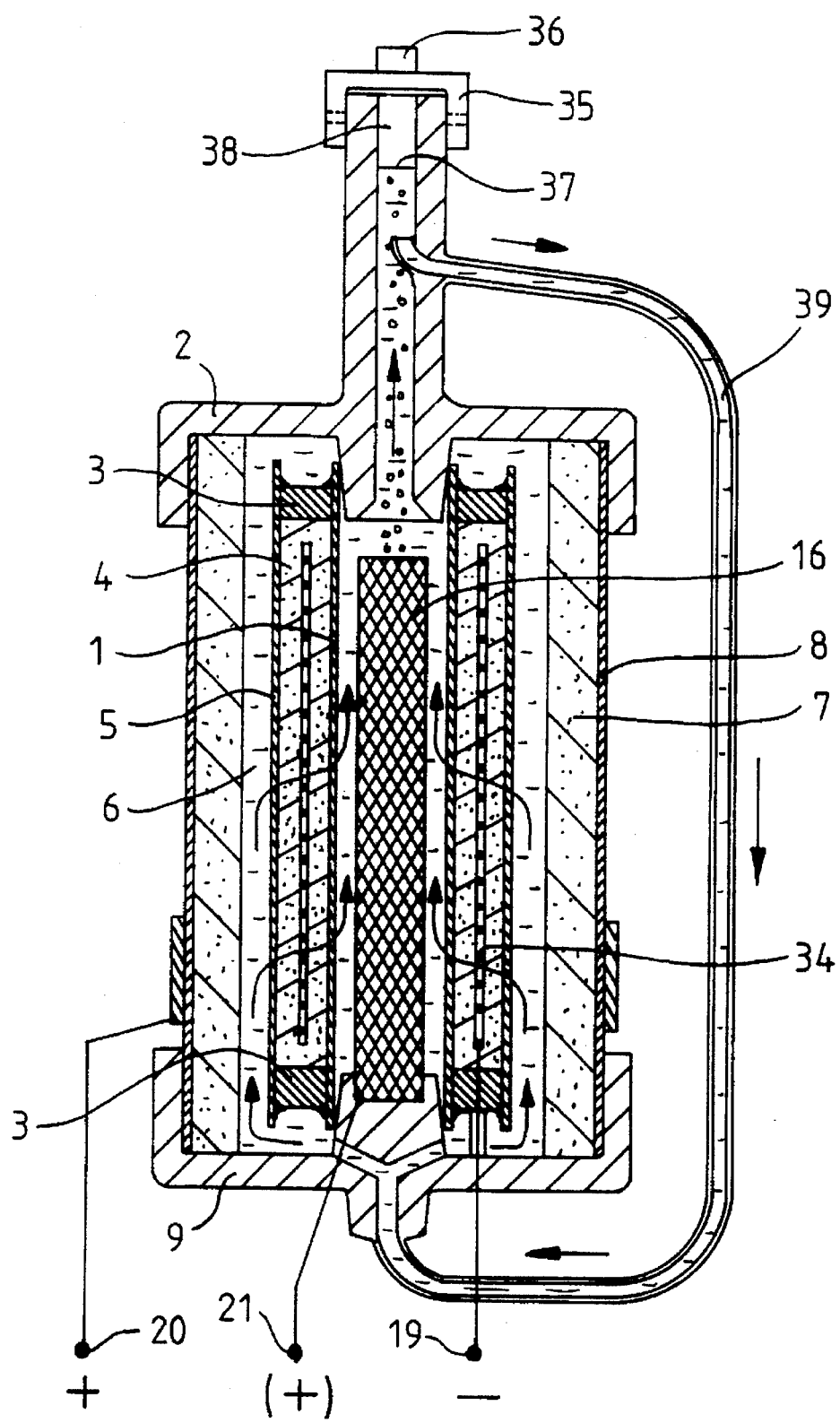

FIG. 5 shows the cell of FIG. 3 but realized with external circulation of the electrolyte. The solution differs from FIG. 3 in that the return duct 39 is situated outside the cell 32. External circulation gives more even liquid distribution.

Figure 6:
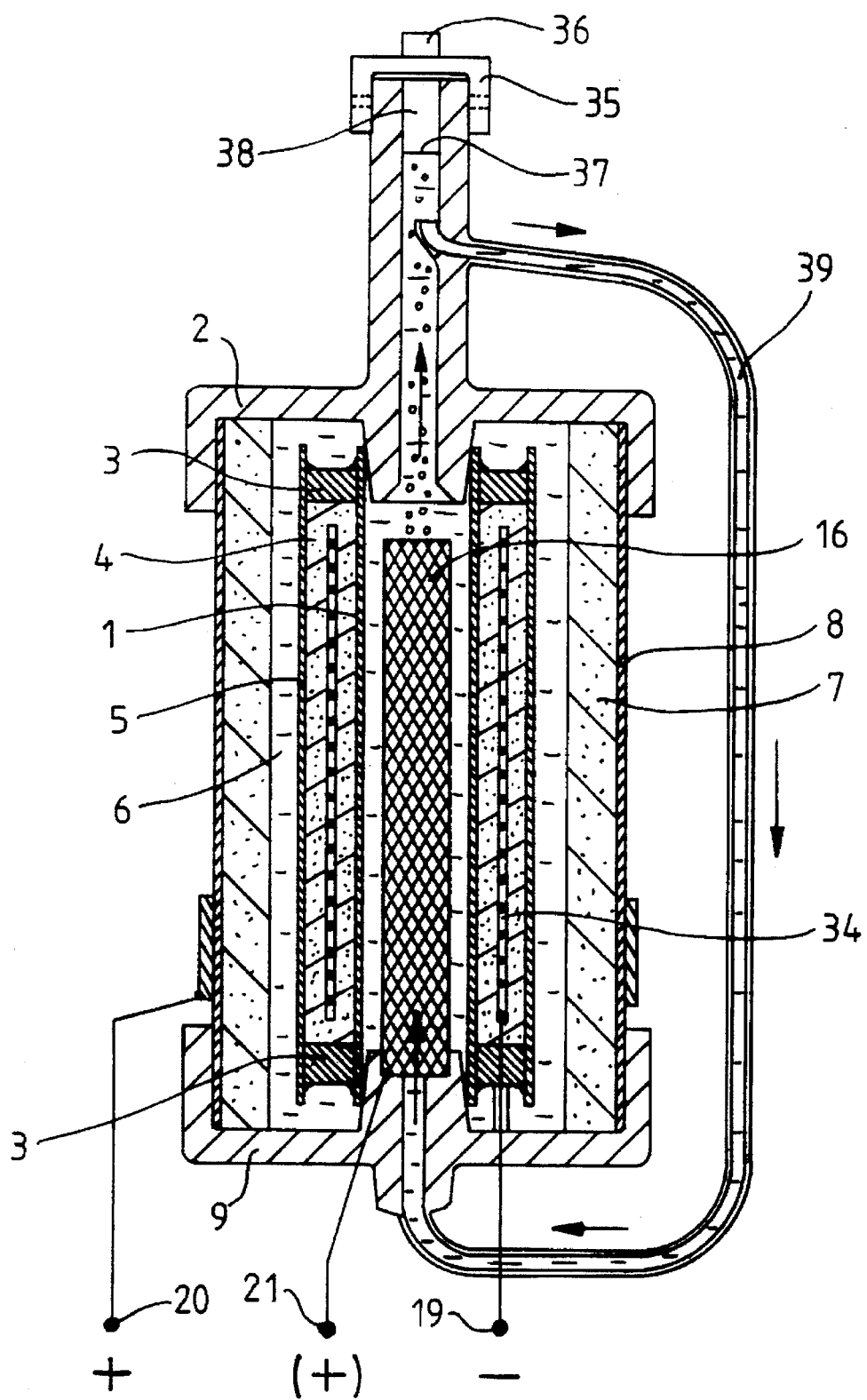

FIG. 6 shows the cell of FIG. 4 but realized with external circulation of the electrolyte. The solution differs from FIG. 4 in that the return duct 39 is situated outside the cell 32, and the electrolytic liquid is led directly to the auxiliary electrode.

Figure 7:
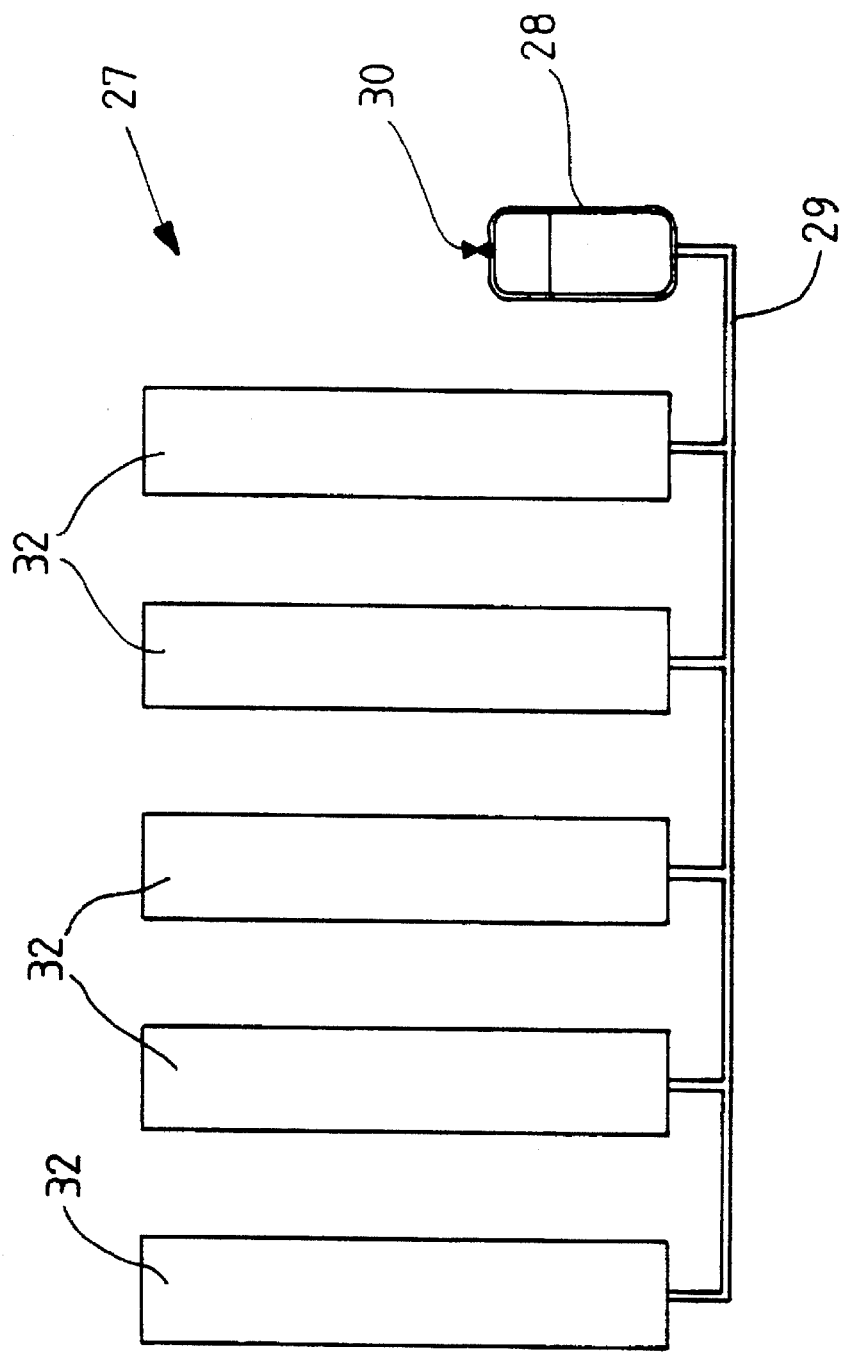

FIG. 7 shows the battery 27 consisting of several cells 32 as shown in FIG. 2, and a separate liquid container 28 connected to the battery by means of piping 29. During discharging water is formed in the cell, which is then used up in charging. Therefore, a separate liquid container 28 is connected to the cells, into which container the water formed in the discharging process can be transferred and from where the water required in charging enters the cells. The battery can be pressurized through the valve 30 in the liquid container.

Figure 8:
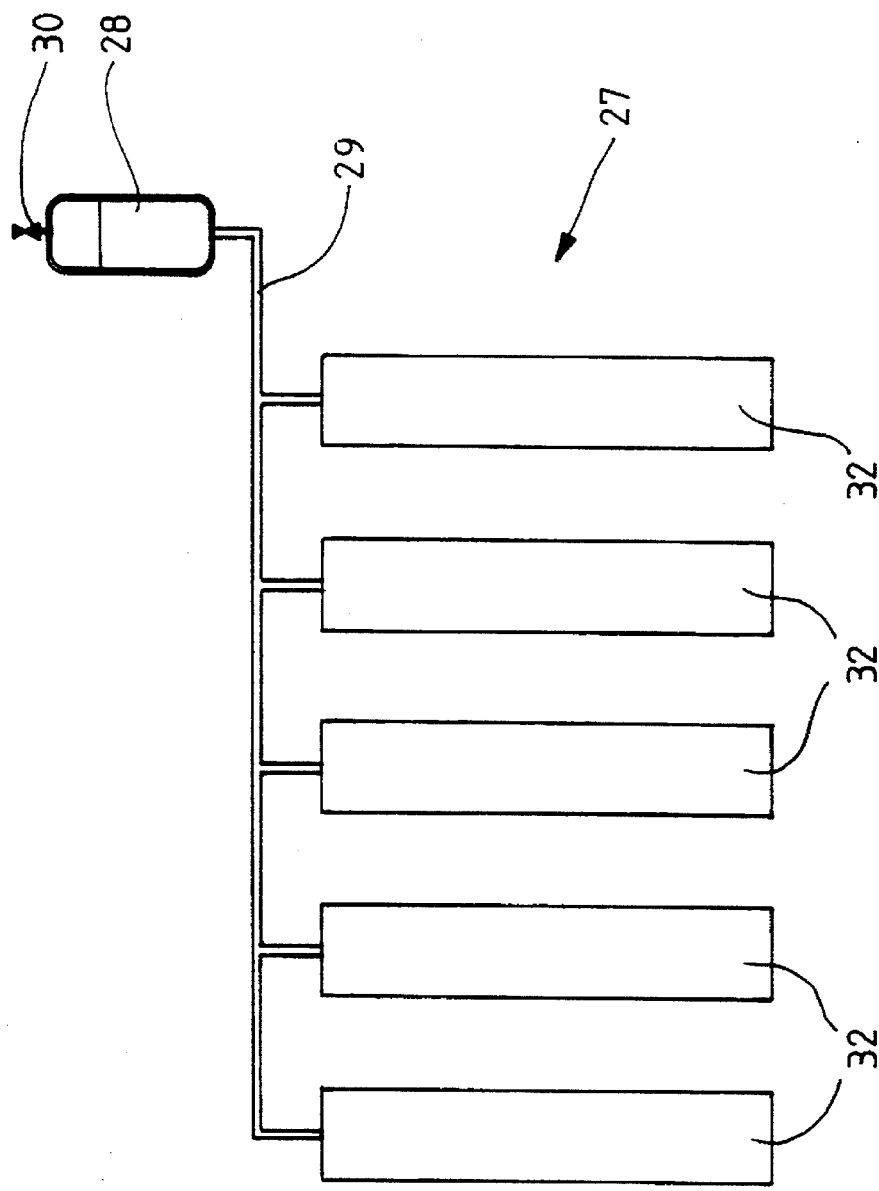

FIG. 8 corresponds otherwise to FIG. 7 except that the battery 27 consists of several cells 32 which may be as shown in FIGS. 1, 2, 3 or 4, and in which the liquid passes between the cell 32 and the separate liquid container 28 through the pipe 29 located in the upper part of the cell.

Figure 9:
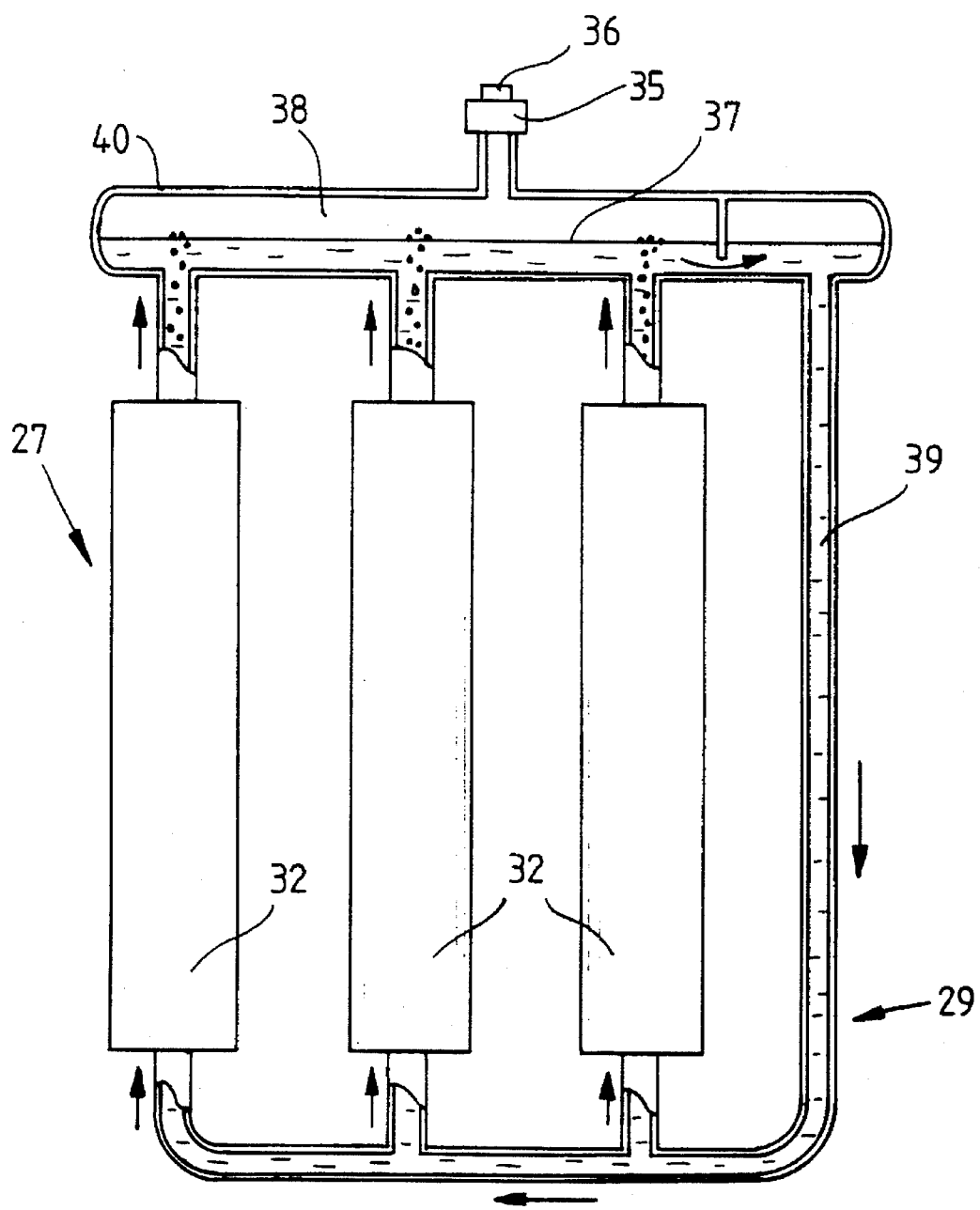
FIG. 9 shows a third embodiment of the system provided with external electrolyte circulation.

FIG. 9 shows a system in which the cells are provided with external circulation of the electrolyte. The cells connected electrically in parallel may be provided with common electrolyte circulation and a common liquid container 40, and with a common overpressure valve 35 and liquid supply valve 36.

Figure 10:
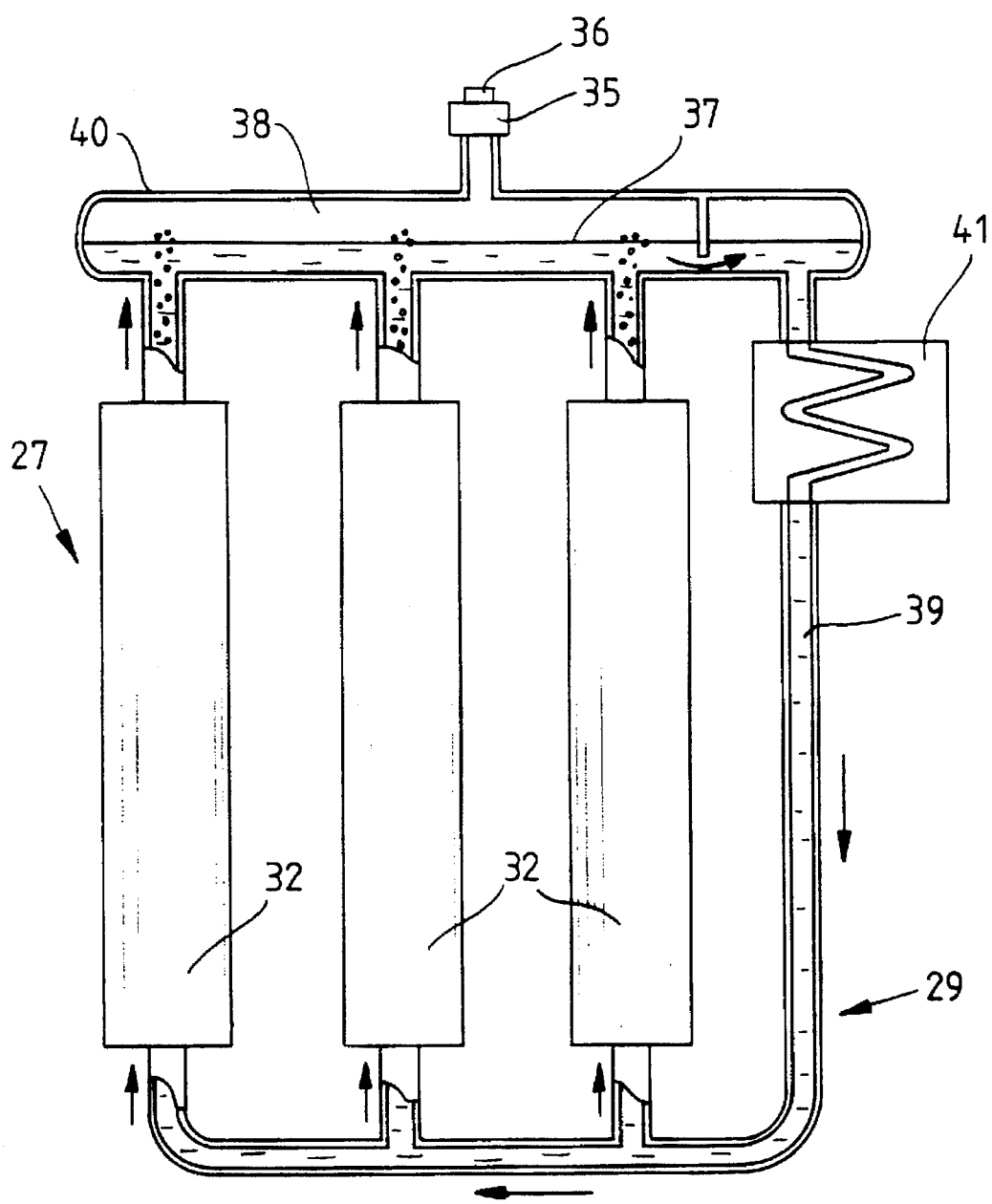
FIG. 10 shows a fourth embodiment of the system provided with external electrolyte circulation and cooling.

FIG. 10 corresponds otherwise to the system of FIG. 9 except that to the return tube 39 of the electrolyte is connected a heat exchanger 41 for cooling the electrolyte. Cooling is important, for example, because the discharging pressure of hydrogen from the metal hydride increases as the temperature rises. Without cooling, a higher pressure would have to be used in the cell.

Figure 11:
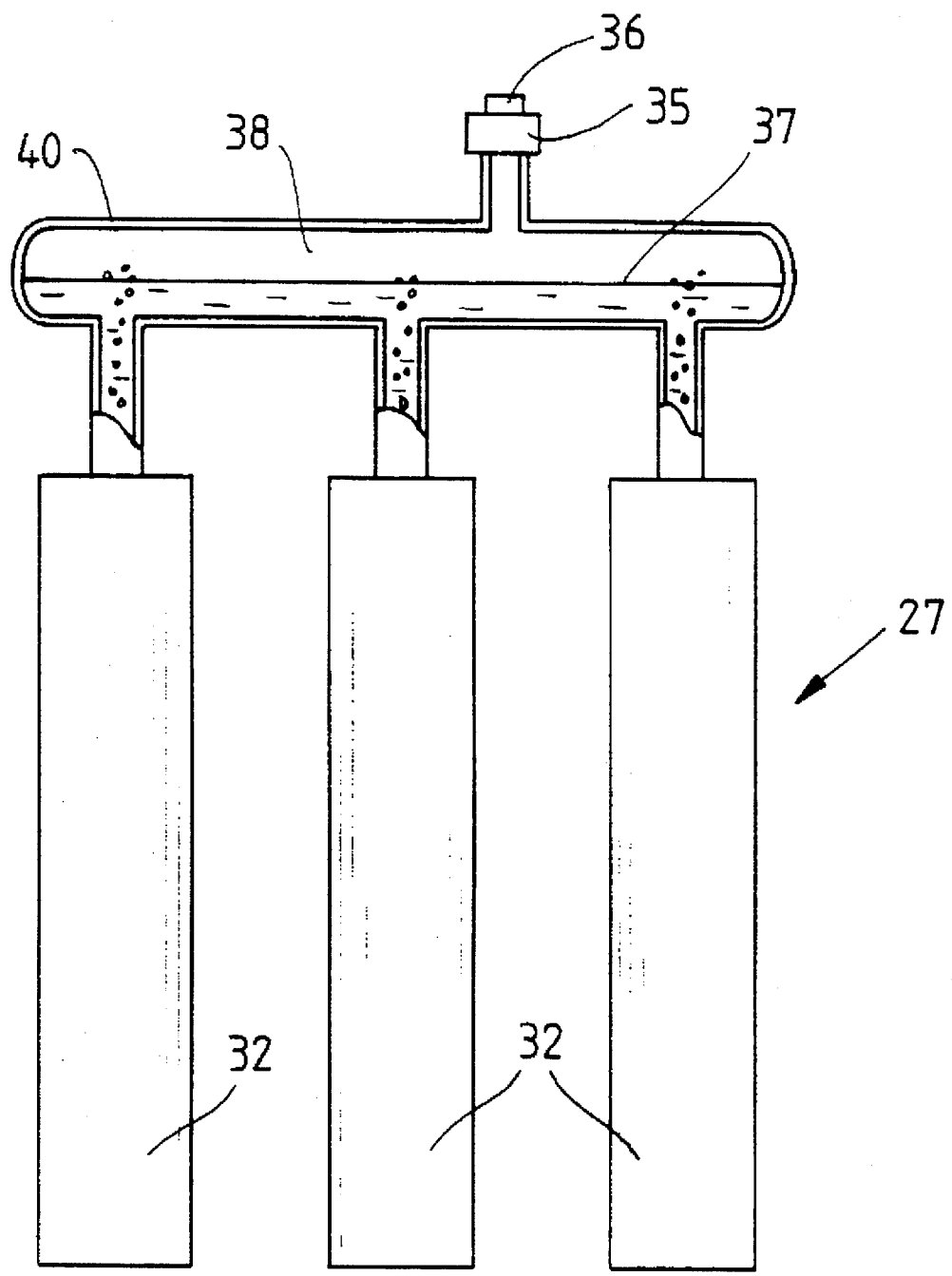
FIG. 11 shows a fifth embodiment of the system without external electrolyte circulation.

FIG. 11 corresponds otherwise to the system of FIG. 9 except that it does not have external circulation of the electrolyte. Circulation may, however, be arranged internally in the cell 32, as shown in FIG. 3 or 4.

Figure 12:
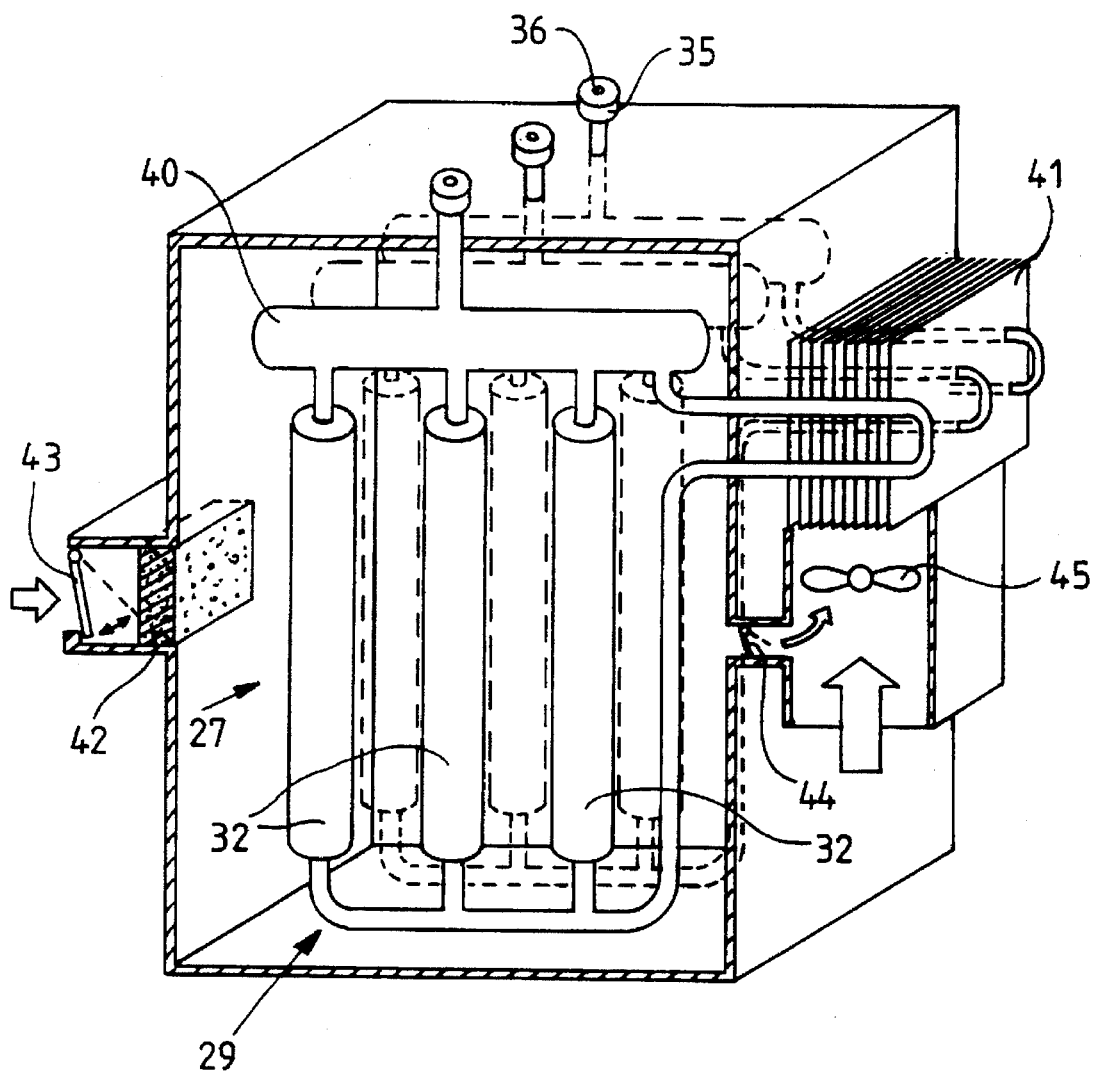
FIG. 12 shows a sixth embodiment of the system provided with external electrolyte circulation, cooling, and a carbon dioxide filter for incoming air.

FIG. 12 shows a complete battery system to which a carbon dioxide filter 42 has been connected. In the system, the battery is located in a closed chamber to which air is supplied through the carbon dioxide filter 42. When the battery is not in use, the carbon dioxide filter is protected from the effect of carbon dioxide in the air by means of a protective flap 43 which opens only when the electric charge of the battery is discharged. To ensure an even supply of oxygen, a small amount of additional air is supplied to the battery, the said air discharging from the chamber through a discharge flap 44. The fan 45 causes air to discharge from the chamber and at the same time it blows cooling air into the heat exchanger 41 of the electrolytic solution.

Figure 13:
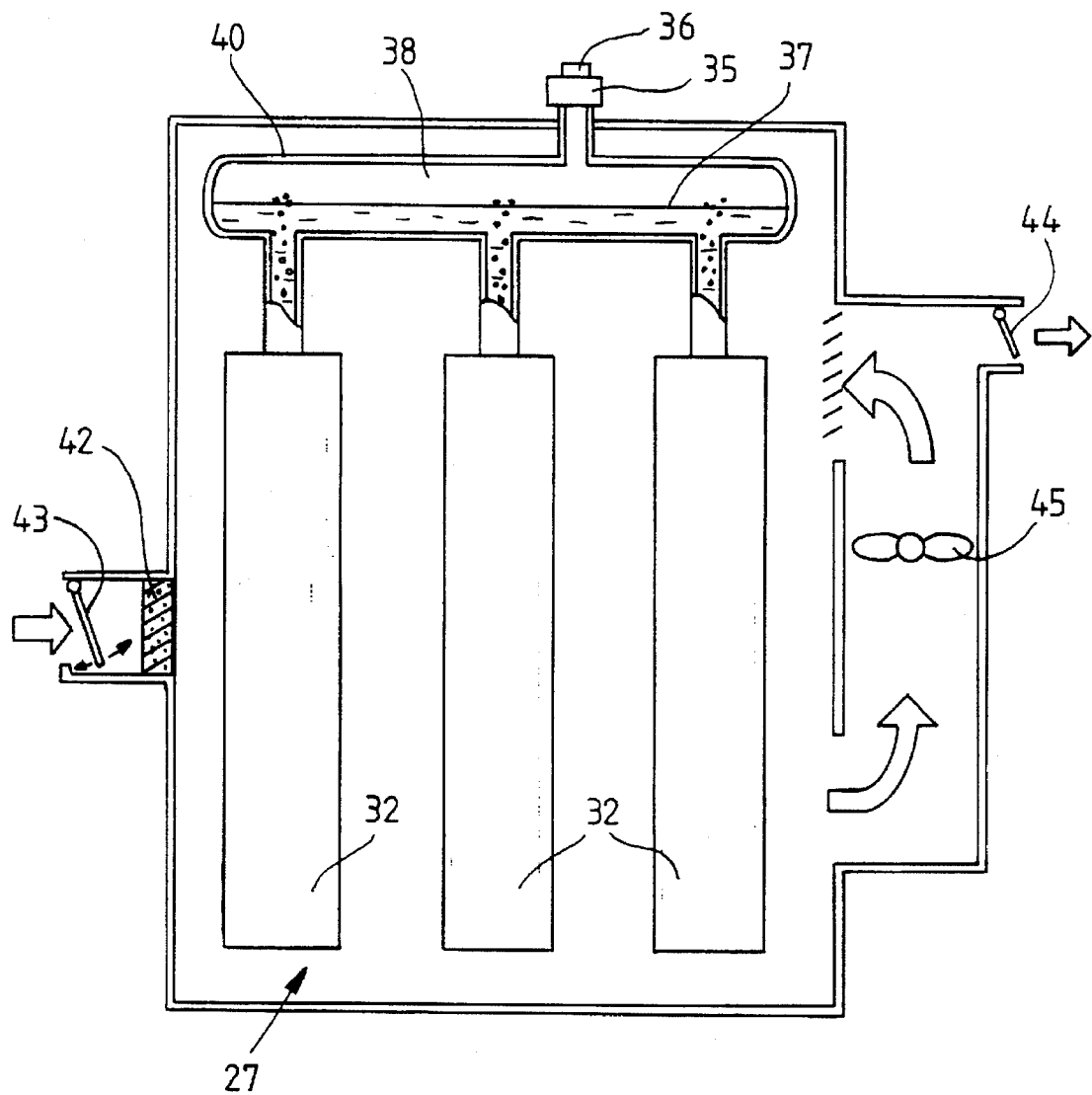
FIG. 13 shows a seventh embodiment of the system without external electrolyte circulation, provided with air cooling and a carbon dioxide filter for incoming air.

The apparatus of FIG. 13 is otherwise similar to the apparatus shown in FIG. 12, but without electrolyte circulation. Cooling has been effected by means of the fan 45, by circulating air between the cells.

Figure 14:
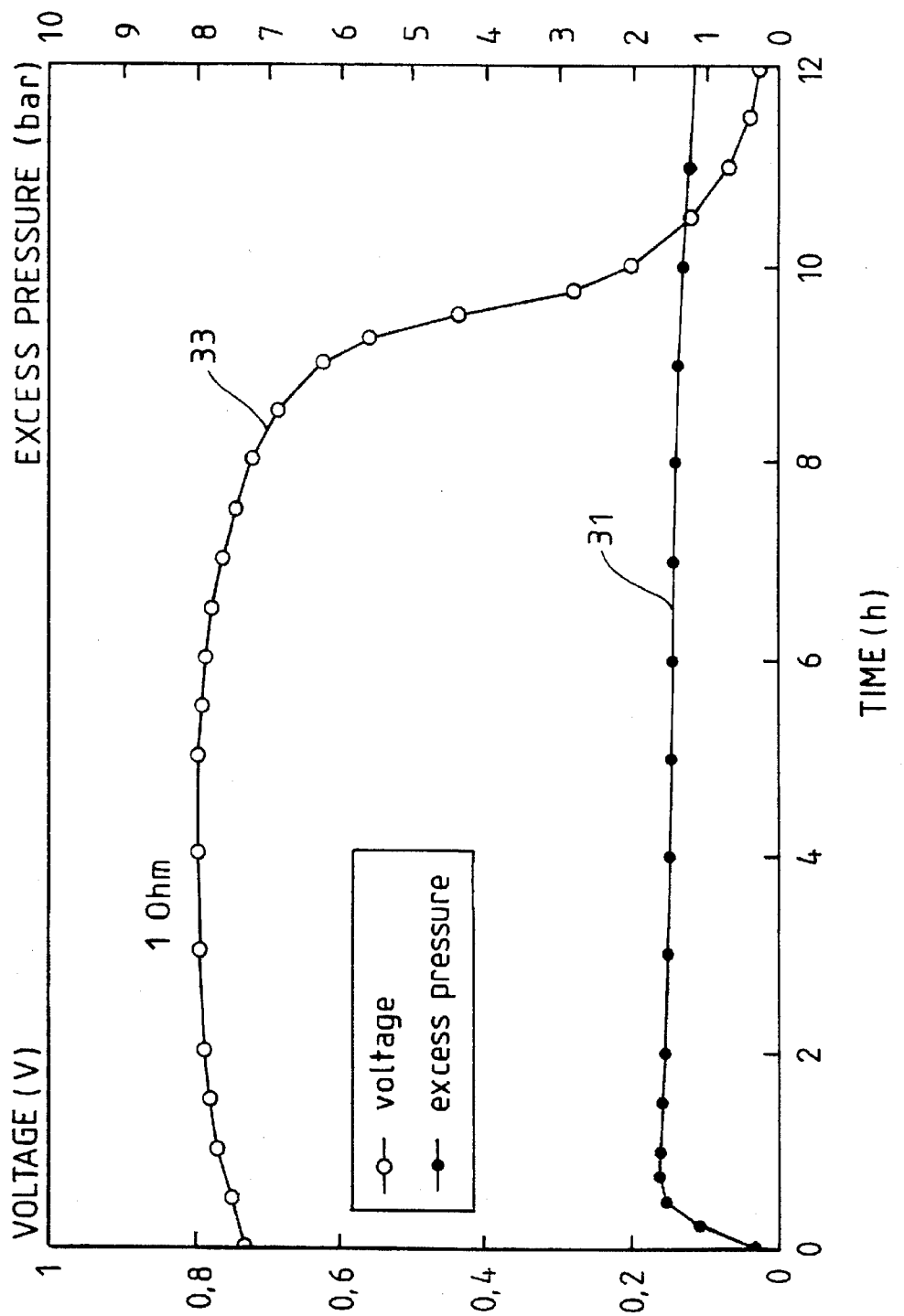
FIG. 14 shows diagrammatically a discharge test of an apparatus according to the invention, where the voltage and overpressure have been measured as a function of time.

FIG. 14 shows diagrammatically an experimental discharge curve 33 with the voltage as a function of time. In the discharge test, the (+) and (−) poles are connected by means of a resistance which functions as a load. In this case a resistance of 1 ohm was used, and the cell was as in FIG. 1. The voltage of the cell, as shown in the discharge curve of FIG. 14, is measured from the poles of the cell. The current passing in the external circuit is obtained by calculation on the basis of the cell voltage and the known resistance, or load. With a resistance of one ohm, the current in amperes is the same as the the voltage in volts. The surface area of the curve is the same as the amount of electricity obtained from the cell in ampere-hours, that is, 7.5 Ah in the case of FIG. 14. When a curve is formed from this, showing the product of current and voltage as a function of time, the area of this new curve gives the energy obtained from the cell. By dividing the energy obtained by the LaNi mass of the metal hydride, which was 23.0 g in this case, the energy density obtained for the cell is 242 Wh/kg. The overpressure curve 31 shows that during the test, the overpressure in the cell was 1.4 bar.

Figure 15:
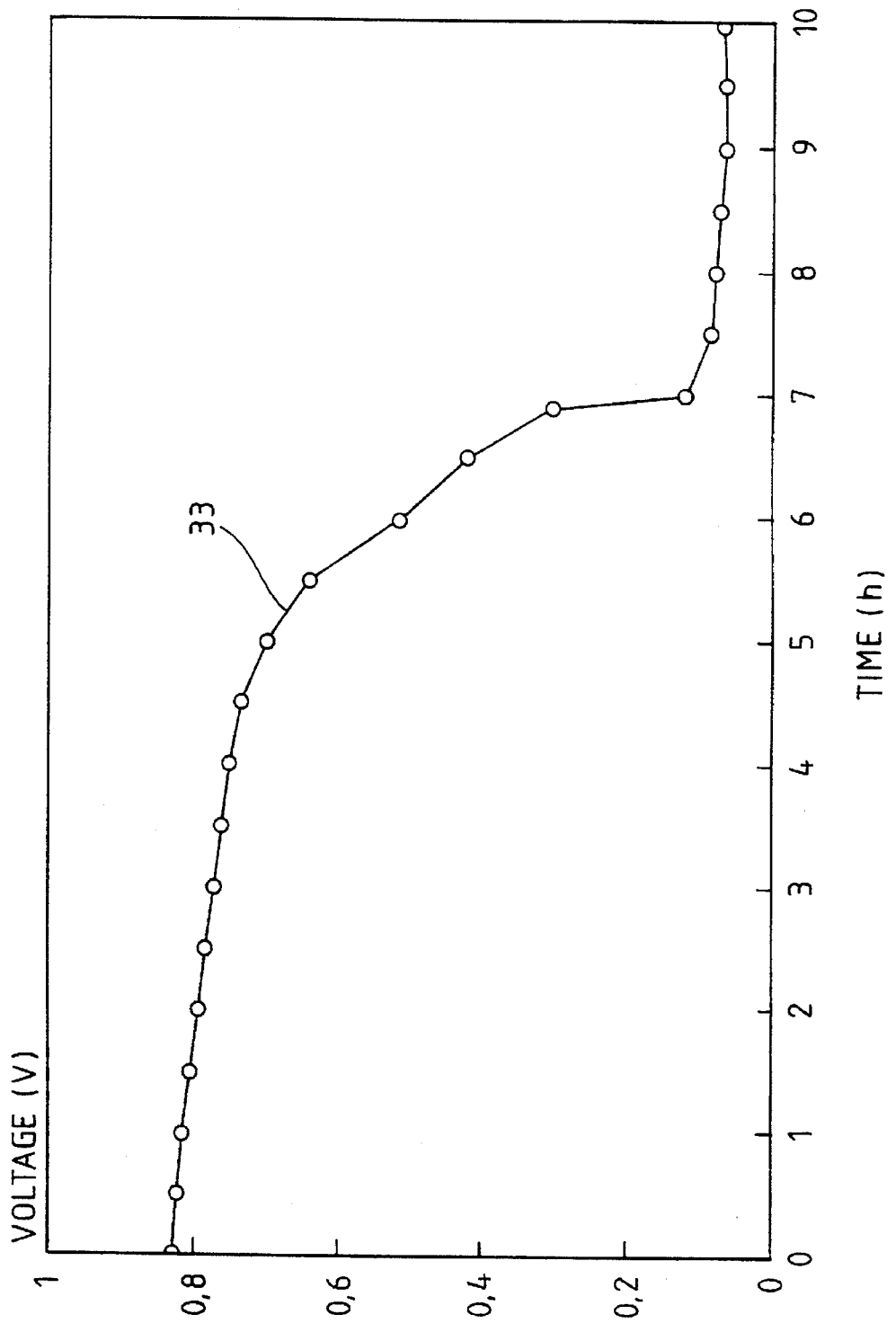
FIG. 15 shows the diagram representing another discharge test.

FIG. 15 shows diagrammatically the discharge curve 33 with the voltage of the cell as a function of time. The fact that little self-discharging takes place has been confirmed experimentally by leaving the cell at rest for 65 h, that is, 2.7 days after charging and only then starting the discharge test. The cell was discharged with a load of 1 ohm. The energy obtained in discharging was 251 Wh/kg of active material (LaNi$_5$), that is, approximately the same amount as in the test shown in FIG. 14, where discharging was started immediately after charging.

The overpressure used in the test shown in FIG. 15 was approximately 1.7 bar, which represents the equilibrium pressure of hydrogen at a temperature of somewhat below 20° C., in the case of an LaNi$_5$ metal hydride electrode. The effect of overpressure on the formation of gas bubbles was examined in a test where the overpressure was increased gradually from zero to three bar within about 1.5 hours. At the beginning, the formation of bubbles could be seen through the transparent upper part of the cell, but this ceased at an overpressure of 1.7 bar.

We claim:

1. A method for storing and producing electrical energy, comprising providing an electrochemical cell comprising a closed container containing an electrolytic solution having immersed therein a cathode comprising a porous air electrode and an anode comprising a hydrogen-containing metal hydride such that there is a gas space between a surface of said solution and a cover of said container;

means for supplying an oxygen-containing gas to said porous air electrode;

means for supplying electrons to said cathode;

means for collecting and withdrawing electrons from said anode;

providing an oxygen-containing gas in said gas space at an overpressure which is greater than a pressure of ambient air outside said electrochemical cell.

2. The method of claim 1, wherein said overpressure is increased during charging of said electrochemical cell.

3. The method of claim 1, wherein said overpressure is increased during discharging of said electrochemical cell.

4. The method of claim 1, wherein said overpressure is sufficient to prevent formation of hydrogen bubbles on a surface of said anode.

5. The method of claim 1, wherein said overpressure is maintained by permitting said electrolytic solution to penetrate into pores of said porous air electrode.

6. The method of claim 1, further comprising electrochemically re-hydrogenerating said metal hydride while said anode is in said electrochemical cell by means of said air electrode.

7. The method of claim 1, further comprising electrochemically re-hydrogenerating said metal hydride while said anode is in said electrochemical cell by means of a separate auxiliary electrode.

8. The method of claim 7, wherein oxygen gas formed in said auxiliary electrode is discharged from said electrochemical cell into ambient air after said overpressure is achieved.

9. The method of claim 7, wherein said closed container comprises at least one duct to deliver electrolytic solution to said anode or said auxiliary electrode.

10. The method of claim 1, further comprising circulating said electrolytic solution within said closed container during charging of said electrochemical cell.

11. The method of claim 1, further comprising circulating said electrolytic solution within said closed container during discharging of said electrochemical cell.

12. The method of claim 1, further comprising cooling said electrochemical cell by blowing air upon an outer surface of said closed container.

13. The method of claim 1, wherein said means for supplying an oxygen-containing gas to said porous air electrode includes a carbon dioxide filter which is open to the outside air only during discharging of said electrochemical cell.

14. An apparatus for storing and producing electrical energy, comprising an electrochemical cell comprising a closed container containing an electrolytic solution having immersed therein a cathode comprising a porous air electrode and an anode comprising a hydrogen-containing metal hydride such that there is a gas space between a surface of said solution and a cover of said container;

means for supplying an oxygen-containing gas to said porous air electrode;

means for supplying electrons to said cathode;

means for collecting and withdrawing electrons from said anode;

said closed container having an oxygen-containing gas in said gas space at an overpressure which is greater than a pressure of ambient air outside said electrochemical cell.

15. The apparatus of claim 14, wherein a pore size of said porous air electrode is so small that a surface tension of said electrolyte solution maintains said overpressure.

16. The apparatus of claim 14, wherein said porous air electrode is cylindrical.

17. The apparatus of claim 14, further comprising an overpressure valve operable to discharge oxygen containing gas from said gas space.

18. The apparatus of claim 14, further comprising a separate auxiliary electrode located within said closed container and capable of electrochemically re-hydrogenerating said metal hydride while said anode is in said electrochemical cell.

19. The apparatus of claim 14, wherein said porous air electrode has a pore size smaller than 0.0001 mm.

20. The apparatus of claim 18, wherein said closed container comprises at least one duct adapted to deliver electrolytic solution to said anode or said auxiliary electrode.

21. The apparatus of claim 18, further comprising at least one duct outside of said closed container and adapted to deliver electrolytic solution to said anode or said auxiliary electrode.

22. The apparatus of claim 21, further comprising means for cooling said electrolytic solution which is contained within said duct.

23. The apparatus of claim 22, wherein said means for cooling said electrolytic solution comprises a fan.

24. The apparatus of claim 14, wherein said means for supplying an oxygen-containing gas to said porous air electrode includes a carbon dioxide filter which is open to the outside air only during discharging of said electrochemical cell.

* * * * *